(12) United States Patent
Kooi

(10) Patent No.: US 6,662,586 B2
(45) Date of Patent: Dec. 16, 2003

(54) METHOD AND DEVICE FOR TRANSPORTING A CONTAINER

(75) Inventor: Eeuw Durk Kooi, Noordwijk (NL)

(73) Assignee: TRS Transportkoeling B.V., Aalsmeer (NL)

( * ) Notice: Subject to any disclaimer, the term of this patent is extended or adjusted under 35 U.S.C. 154(b) by 0 days.

(21) Appl. No.: 10/165,124

(22) Filed: Jun. 7, 2002

(65) Prior Publication Data

US 2003/0005715 A1 Jan. 9, 2003

(30) Foreign Application Priority Data

Jun. 11, 2001 (NL) .............................. 1018257

(51) Int. Cl.[7] .............................. B60H 1/32; F25B 27/00
(52) U.S. Cl. ......................................... 62/243; 62/323.3
(58) Field of Search ................ 62/243, 323.3

(56) References Cited

U.S. PATENT DOCUMENTS

| | | | | |
|---|---|---|---|---|
| 3,603,105 A | * | 9/1971 | Figa | 62/230 |
| 5,085,269 A | * | 2/1992 | Aoki | 165/43 |
| 5,177,978 A | * | 1/1993 | Brown | 62/236 |
| 5,226,294 A | * | 7/1993 | Mayer | 62/323.1 |
| 5,333,679 A | * | 8/1994 | Suzuki et al. | 165/43 |

* cited by examiner

*Primary Examiner*—William E. Tapolcai
(74) *Attorney, Agent, or Firm*—Jones Day

(57) ABSTRACT

A method and a vehicle for the transport by road of a container fitted with an electrically driven plant, in particular a refrigerating or freezing plant. The container is placed on the vehicle and the driving motor of the vehicle drives a hydraulic pump, which hydraulic pump drives a hydraulic motor, which motor drives a generator for generating electric current to be supplied to the container.

13 Claims, 1 Drawing Sheet

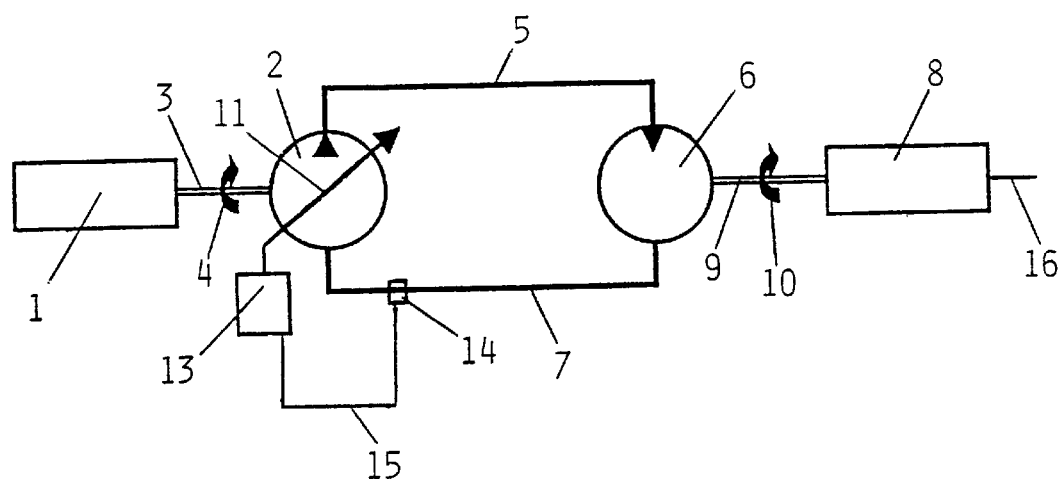

METHOD AND DEVICE FOR TRANSPORTING A CONTAINER

FIELD OF THE INVENTION

PRIORITY CLAIM

This application claims the benefit of Netherlands Patent Application No. 1018257, filed Jun. 11, 2001.

The invention relates to a method for the transport by road of a container fitted with an electrically driven plant, in particular a refrigerating or freezing plant, wherein the container is placed on a vehicle. More than one container may be present on the vehicle.

BACKGROUND OF THE INVENTION

A container in which goods are transported may be fitted with an electrically driven plant, for example a refrigerating plant, a freezing plant or an air-conditioning plant. It is important to supply such a plant with electric power during transport, so as to keep the goods in good condition at all times. If the container is present in a container ship, the electric plant may be connected to the ship's power supply plant by means of an electric lead. If the container must also be transported by road on a truck, special arrangements must be made if electric current is to be supplied to the container during said road transport as well. Such an arrangement may comprise the provision of a diesel generator consisting of a diesel engine with a generator capable of generating electric current, which diesel generator may be mounted on the truck, for example beside the container.

A diesel generator is capable of generating electric current having the desired voltage and the desired frequency. This is important, because the plants of some containers must be supplied with electric current having a specific frequency and/or voltage, or a frequency and/or voltage that must range within specific bounds, for example of frequency ranging between about 50 Hz and about 60 Hz and a voltage of about 380 V or about 440 V.

The containers in question are, for example, the standard containers that can be transported on a truck, such as containers having a length of 45', 40' or 20'. Generally, two containers are present on a truck when the latter type is used. The term truck is understood to mean any type of vehicle that is capable of transporting a cargo by road, including a truck and trailer or an articulated truck or other vehicle consisting of more than one part.

SUMMARY OF THE INVENTION

The object of the invention is to provide a method for the transport by road of a container which is supplied with electric current in an efficient manner during transport.

In order to accomplish that objective, the driving motor of the vehicle drives a hydraulic pump, which hydraulic pump drives a hydraulic motor, which motor drives a generator for generating electric current to be supplied to the container. Preferably, the hydraulic pump is mechanically connected to the driving motor, to which end the pump may be mounted on the driving motor. The hydraulic motor may be positioned directly beside the hydraulic pump, but preferably flexible fluid lines are present between the hydraulic pump and a hydraulic motor, so that said hydraulic pump and said hydraulic motor can be mounted at locations some distance away from each other on the truck. In that case, the hydraulic motor may be mounted at a location where sufficient space is available both for the motor and for the generator, which can be mounted directly beside the motor in that case, so as to enable a simple mechanical connection between the two. Preferably, the motor and the generator are mounted in abutting relationship, coaxially with respect to a common axis of rotation, so that they can be directly coupled together.

Another advantage of the use of a hydraulic pump which drives a hydraulic motor is the relatively simple regulating possibility that is thus provided. The fluid flow between the pump and the motor can easily be influenced. For example, by maintaining the delivery (fluid volume per unit time) of fluid that is carried to the hydraulic motor at a predetermined value, or within predetermined bounds, by means of a hydraulic valve, the number of revolutions of the hydraulic motor, and thus the number of revolutions of the generator, will remain within predetermined bounds, as a result of which also the frequency of the generated electric current will remain within predetermined bounds. The same obtains with regard to the power that is supplied to the generator, which can likewise be regulated by means of a hydraulic valve.

Preferably, the hydraulic pump has a regulable fluid volume per revolution, in connection with which the pump may be a plunger pump having a regulable stroke volume, for example. By varying the fluid volume per revolution with a varying number of revolutions of the hydraulic pump, it becomes possible to keep the fluid output substantially constant at all times, whilst in addition care can be taken that the minimum amount of energy required for generating the electric current is taken from the driving motor of the vehicle.

Furthermore it may be advantageous if the hydraulic motor has a regulable fluid volume per revolution. This makes it possible to adapt the number of revolutions of the generator to the number of revolutions of the driving motor. If both the hydraulic pump and the hydraulic motor have a variable fluid volume per revolution, a greater speed range of the generator relative to the driving motor can be effected.

Preferably, the number of revolutions of the generator is kept within predetermined bounds by varying the fluid volume per revolution of the hydraulic pump and/or of the hydraulic motor. The number of revolutions of the generator is preferably regulated such that the frequency of the AC current that is being output ranges between 40 Hz and 70 Hz, more preferably between about 50 Hz and about 60 Hz.

In one preferred embodiment, the hydraulic pump has a regulable fluid volume per revolution and the hydraulic motor has a fixed fluid volume per revolution. The number of revolutions of the hydraulic motor and of the generator connected thereto, and thus the frequency of the electric current that is being generated, is kept within predetermined bounds by varying the fluid volume per revolution of the pump with a varying number of revolutions of the driving motor and of the hydraulic pump connected thereto.

In one preferred embodiment, the fluid output of the hydraulic pump is measured and the fluid volume per revolution of the hydraulic pump is varied in dependence on the measured value, such that the fluid output of the pump will remain substantially constant whilst the number of revolutions may vary. Thus a practically constant frequency of the electric current is achieved if the motor has a fixed fluid volume per revolution.

The measuring of a fluid flow through a conduit is relatively easy. It can be done, for example, my measuring the fluid pressure difference across a restriction. The measured value can be fed back to the control device of the hydraulic pump, the fluid volume per revolution of which is adjusted on the basis of the measured value.

Preferably, the generator generates an AC current having a voltage of more than 200 V, preferably more than 350 V. In one preferred embodiment, the AC current has a voltage of about 380 V, and in another preferred embodiment the AC current has a voltage of about 440 V; in those cases the frequency of the AC current is preferably maintained between 40 Hz and 70 Hz, more preferably between about 50 Hz and about 60 Hz.

In one preferred embodiment, more than one container may be present on the vehicle, and each of the containers is fed with electric current from the generator. Each containers may be placed on a different part of the vehicle; for example, a first container on a first part of the vehicle, on which also the driving motor is present, and a second container on a trailer which is coupled to the first part of the vehicle. In the case of an articulated vehicle, the driving motor is present on the tractive part of the vehicle, whilst the container is present on the part that is coupled thereto. In all cases, the hydraulic pump is mounted near or on the driving motor, whilst preferably the hydraulic motor and the generator are also mounted on the part of the vehicle on which the driving motor is present.

The invention furthermore relates to a vehicle for the transport by road of a container fitted with an electrically driven plant, in particular a refrigerating or freezing plant, wherein the container can be placed on a vehicle and wherein the driving motor of the vehicle drives a hydraulic pump, which hydraulic pump drives a hydraulic motor, which motor drives a generator, which generator is provided with conducting means, for example a connecting lead, for carrying electric current that is being generated to the container.

Preferably, the vehicle is provided with measuring means for measuring the fluid output of the hydraulic pump and with a control device for varying the fluid volume per revolution of the hydraulic pump in dependence on the measured fluid output.

The vehicle may be composed of several interconnected parts, for example a tractor with a semi-trailer or a driven vehicle with a trailer.

In order to more fully explain the invention, an embodiment of a vehicle fitted with means for supplying electric current to a container will be described hereinafter with reference to the drawing.

DESCRIPTION OF THE DRAWINGS

The drawing is a schematic representation of a device for generating the electric current such as may be present on a vehicle.

DETAILED DESCRIPTION OF THE INVENTION

The drawing shows the driving motor 1 of the vehicle, the number of revolutions of which driving motor 1 generally varies, in particular while the vehicle is driving. The number of revolutions may vary between 1000 and 5000 rpm, for example.

A hydraulic pump 2 is mounted on the driving motor 1, which pump is driven by the driving motor 1 via a mechanical connection 3, and which rotates at the same speed as the driving motor 1, therefore. The arrow 4 indicates the direction in which the connection 3 rotates.

The hydraulic pump 3 has a pressure line 5, by means of which hydraulic fluid is carried to a hydraulic motor 6, and a return line 7, by means of which hydraulic fluid is returned from the motor 6 to the pump 2. Thus, the motor 6 is driven by the pump 2.

The hydraulic motor 6 in turn drives a generator 8 via a mechanical connection 9, the direction of rotation of which is indicated by the arrow 10. The motor 6 and the generator 8 may be joined into one unit. The lines 5 and 7 may have a length such that said unit 6, 8, 9 can be arranged at a suitable location in the vehicle, possibly at a relatively large distance from the driving motor 1. The fluid lines 5, 7 may be flexible conduits in whole or in part in that case, which makes it possible to mount the hydraulic pump 2 and the hydraulic motor 6 on different parts of the vehicle, which parts are movable relative to each other.

The hydraulic pump 2 has a regulable stroke volume, i.e. it is possible to adjust the fluid volume per revolution, which is indicated by the arrow 11. The stroke volume is regulated by the control device 13.

In the illustrated embodiment, the magnitude of the fluid flow in the return line 7 is measured by means of a measuring instrument 14, which passes on the measured value to the control device 13 via a line 15. The control device 13 regulates the stroke volume of the hydraulic pump 2 such that the magnitude of the measured fluid flow will remain substantially constant. As a result, the number of revolutions of the hydraulic motor 6 will remain substantially constant, which in turn leads to the frequency of the electric current generated by the generator 8 remaining substantially constant.

The electric current generated by the generator 8 is carried to a container present on the vehicle by means of an electric lead 16, for example for the purpose of driving a freezing plant inside the container.

What is claimed is:

1. A method for the transport by road of a container fitted with a refrigerating or freezing plant, comprising the steps of:

placing said container on a vehicle;
   driving a hydraulic pump mounted on said vehicle using a driving motor of said vehicle;
   driving a hydraulic motor mounted on said vehicle with said hydraulic pump; and
   driving a generator mounted on said vehicle with said hydraulic motor for generating electric current to be supplied to said container.

2. A method according to claim 1, characterized in that the hydraulic pump has a regulable fluid volume per revolution.

3. A method according to any claim 2, characterized in that the hydraulic motor has a regulable fluid volume per revolution.

4. A method according to claim 3, characterized in that the number of revolutions of the generator is kept within predetermined bounds by varying the fluid volume per revolution of the hydraulic pump and/or of the hydraulic motor.

5. A method according to claim 1, characterized in that the number of revolutions of the generator is regulated such that the frequency of the AC current that is being output ranges between 40 Hz and 70 Hz, preferably between about 50 Hz and about 60 Hz.

6. A method according to claim 1, characterized in that the hydraulic pump has a regulable fluid volume per revolution and the hydraulic motor has a fixed fluid volume per revolution, wherein the number of revolutions of the hydraulic motor and of the generator connected thereto is kept within predetermined bounds by varying the regulable fluid volume per revolution with a varying number of revolutions of the driving motor and of the hydraulic pump connected thereto.

7. A method according to claim 1, characterized in that the fluid output of the hydraulic pump is measured and in that the fluid volume per revolution of the hydraulic pump is varied in dependence on the measured value.

8. A method according to claim 1, characterized in that the generator generates an AC current having a voltage of more than 200 V, preferably more than 350 V.

9. A method according to claim 1, characterized in that more than one container is present on the vehicle, and each of the containers is fed with electric current from the generator.

10. A road vehicle having a container fitted with a refrigerating or freezing plant, comprising:
- a vehicle having a driving motor, said container being mounted on said vehicle;
- a hydraulic pump mounted on said vehicle and being driven by said driving motor of said vehicle;
- a hydraulic motor mounted on said vehicle for driving said hydraulic pump; and
- a generator mounted on said vehicle being driven by said hydraulic motor, said generator including conducting means for carrying electric current being generated by said generator to said container.

11. A vehicle according to claim 10, characterized in that the hydraulic pump has a regulable fluid volume per revolution.

12. A vehicle according to claim 10, characterized in that the hydraulic pump and the hydraulic motor are interconnected by means of flexible fluid lines.

13. A vehicle according to claim 10, characterized by measuring means for measuring the fluid output of the hydraulic pump and a control device for varying the fluid volume per revolution of the hydraulic pump in dependence on the measured fluid output.

* * * * *